(12) United States Patent
Hata et al.

(10) Patent No.: US 9,291,218 B2
(45) Date of Patent: Mar. 22, 2016

(54) VEHICLE CONTROL SYSTEM

(71) Applicant: TOYOTA JIDOSHA KABUSHIKI KAISHA, Toyota-shi, Aichi (JP)

(72) Inventors: Kensei Hata, Toyota (JP); Yuji Iwase, Toyota (JP); Yosuke Suzuki, Toyota (JP); Koichi Kato, Toyota (JP); Seitaro Nobuyasu, Toyota (JP); Taro Moteki, Toyota (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 0 days.

(21) Appl. No.: 14/482,170

(22) Filed: Sep. 10, 2014

(65) Prior Publication Data

US 2015/0073673 A1 Mar. 12, 2015

(30) Foreign Application Priority Data

Sep. 11, 2013 (JP) .................. 2013-188253

(51) Int. Cl.
*B60W 10/02* (2006.01)
*B60W 10/04* (2006.01)
*F16D 48/06* (2006.01)
*B60W 10/06* (2006.01)
*B60W 10/08* (2006.01)
*B60W 30/186* (2012.01)
*B60W 20/00* (2006.01)
*B60K 6/445* (2007.10)

(52) U.S. Cl.
CPC .............. *F16D 48/06* (2013.01); *B60W 10/02* (2013.01); *B60W 10/06* (2013.01); *B60W 10/08* (2013.01); *B60W 20/40* (2013.01); *B60W 30/186* (2013.01); *B60K 6/445* (2013.01); *B60W 2510/0225* (2013.01); *B60W 2710/025* (2013.01); *B60W 2710/028* (2013.01)

(58) Field of Classification Search
None
See application file for complete search history.

(56) References Cited

U.S. PATENT DOCUMENTS

| 6,463,821 | B1 * | 10/2002 | Reed et al. | 74/330 |
|---|---|---|---|---|
| 2002/0108457 | A1 * | 8/2002 | Berger et al. | 74/335 |
| 2009/0143189 | A1 | 6/2009 | Hasegawa et al. | |
| 2013/0102429 | A1 * | 4/2013 | Kaltenbach et al. | 475/5 |

FOREIGN PATENT DOCUMENTS

| JP | 8-295140 | 11/1996 |
|---|---|---|
| JP | 2009-132196 | 6/2009 |
| JP | 2010-190254 | 9/2010 |

\* cited by examiner

*Primary Examiner* — Edwin A Young
(74) *Attorney, Agent, or Firm* — Finnegan, Henderson, Farabow, Garrett & Dunner, LLP

(57) ABSTRACT

A vehicle control system to prevent deterioration in controllability of the engagement device resulting from temporal deterioration of the engagement device. The vehicle control system is configured to switch a driving mode selectively between a first driving mode in which the engagement device is disengaged, and a second driving mode in which the engagement device is engaged. The vehicle control system comprises: an estimation means that estimates deterioration in an engagement property of the engagement device; and an engagement means that engages the engagement device after achieving synchronization between an input speed and an output speed, in case the estimation means estimates that the engagement property of the engagement device is deteriorated, and the driving mode is shifted from the first driving mode to the second driving mode.

7 Claims, 6 Drawing Sheets

| Driving Mode | K0 Clutch Engaged: O Disengaged: — |
|---|---|
| Disconnecting EV Mode | — |
| Normal EV Mode | O |
| HV Mode | O |

VEHICLE CONTROL SYSTEM

The present invention present invention claims the benefit of Japanese Patent Application No. 2013-188253 filed on Sep. 11, 2013 with the Japanese Patent Office, the disclosure of which is incorporated herein by reference in its entirety.

BACKGROUND

1. Field of the Invention

The present invention relates to the art of a control system for a vehicle having an engagement mechanism that transmit torque selectively between an engine and a driving wheel, and that governs a torque transmitting capacity.

2. Discussion of the Related Art

Hybrid vehicles typically use an electric motor or a motor-generator (as will be simply called a "motor" hereinafter) as a prime mover together with an engine. The hybrid vehicle of this kind has various advantages over conventionally known vehicles. For instance, the engine is allowed to be stopped temporarily when the hybrid vehicle comes to stop (that is, idle stop), and the motor is allowed to regenerate electric energy during decelerating the hybrid vehicle. In addition, the engine is also allowed to be driven at an optimal driving point to improve energy efficiency. A fuel economy of the hybrid vehicle thus structured is improved by using the motor mainly to drive the vehicle while stopping the engine to avoid consuming fuel. To this end, the engine has to be disconnected from a powertrain including the motor outputting driving force to the driving wheel so as to reduce a power loss resulting from rotating the engine concurrently. A hybrid vehicle comprised of a clutch for disconnecting the engine is described in JP-A-8-295140. In the hybrid vehicle taught by JP-A-8-295140, therefore, the engine is allowed to be stopped and rotated selectively in the case of driving the vehicle by the motor.

According to the teachings of JP-A-8-295140, the first gear element of the differential gear unit is coupled to the generator, the second gear element serves as the output element, and the third gear element is coupled to the breaking means. The third gear element is also coupled to the engine via the clutch. That is, in the hybrid vehicle taught by JP-A-8-295140, the differential gear unit is allowed to serve as a speed reducing device or a speed increasing device by halting the third gear element by the braking means. In this situation, the generator coupled to the first gear element can be used as a motor, and a torque thereof is transmitted to the output element. Consequently, the vehicle is driven by the powers of the generator and the motor. Specifically, the braking means is a one-way clutch adapted to be engaged to halt the third gear element when the third gear element is rotated by the torque in the reverse direction. Therefore, during driving the vehicle by the motor, the third gear element may be halted by the one-way clutch independent of the engine and the clutch may be disconnected from the third gear element. That is, the engine is allowed not only to be driven but also to be stopped during driving the vehicle by the motor. Meanwhile, during driving the vehicle by a torque of the engine coupled to the third gear element via the clutch, a speed of the engine may be controlled by controlling a speed of the generator coupled to the generator. That is, the differential gear unit is allowed to serve as a continuously variable transmission in this situation.

In the hybrid vehicle in which the clutch is thus disengaged during driving the vehicle by the motor, the clutch may be engaged to carry out a cranking of the vehicle and to use the output torque of the engine to drive the vehicle. Meanwhile, an input speed and an output speed of the clutch may differ from each other while the vehicle is running. In this situation, if the clutch is engaged abruptly, the driving force would be changed significantly thereby causing a shock. Such a shock resulting from an abrupt change in the driving force may be avoided by engaging the clutch while changing an engaging pressure gradually, in other words, by engaging the clutch while slipping. However, the clutch may have a fever if it is engaged while slipping, and as a result, durability of the clutch may be degraded.

In order to avoid the foregoing disadvantage, the control device taught by JP-A-2010-190254 is configured to stop a slippage of the clutch compulsory when a predicted heat quantity is greater than the preset criterion. Specifically, according to the teachings of JP-A-2010-190254, the heat quantity of the clutch is calculated based on a required torque transmitting capacity of the clutch and a difference between an input speed and an output speed of the clutch. The control device of JP-A-2010-190254 stops a slippage of clutch by increasing an engaging pressure when an integrated value of heat quantity exceeds a preset criterion value.

In addition, JP-A-2009-132196 discloses a control apparatus of a hybrid vehicle in which the motor is connected to the output shaft of the engine through the first clutch, and driving wheels are connected to the output shaft of the motor through the second clutch. In the hybrid vehicle taught by JP-A-2009-132196, a drive mode can be selected from: an engine-used slip drive mode in which the first clutch is engaged and the second clutch is slip engaged; a motor slip drive mode in which the first clutch is disengaged while slipping the second clutch; and a motor drive mode in which the first clutch is disengaged and the second clutch is engaged. In order to reduce thermal deterioration of the second clutch, if a temperature of the second clutch exceeds a predetermined value under the engine-used slip drive mode, the control apparatus taught by JP-A-2009-132196 switches the drive mode to the motor slip drive mode or the motor drive mode where a slip of the second clutch is smaller than that under the engine-used slip drive mode.

Meanwhile, a pushing force of an actuator for the clutch is controlled in accordance with a required torque transmitting capacity of the clutch. For this purpose, if a friction surface of the clutch is worn with age so that a friction coefficient of the friction surface is changed, control accuracy of the clutch will be deteriorated. In addition, if an elastic member is also used to control the torque transmitting capacity of the clutch, such attrition of the friction face of the clutch changes a required elastic force to achieve a required torque transmitting capacity of the clutch. Thus, the temporal deterioration of the clutch resulting from wear of the friction face will influence the engagement property of the clutch, and this makes the clutch difficult to be controlled.

SUMMARY OF THE INVENTION

The present invention has been conceived noting the above-mentioned technical problems, and it is therefore an object of the present invention is to provide a vehicle control system configured to prevent deterioration in controllability of the engagement device even if the engagement property of the engagement device is deteriorated.

The vehicle control system of the present invention is applied to a vehicle having an engagement device adapted to govern a torque transmitting capacity between an engine and a driving wheel. Specifically, the vehicle control system is configured to switch a driving mode of the vehicle selectively between: a first driving mode in which the engagement device is disengaged to disconnect a torque transmission between the engine and the driving wheel; and a second driving mode in which the engagement device is engaged to transmit a torque between the engine and the driving wheel. In order to achieve the above-explained object, according to the present invention, the vehicle control system is comprised of: an estimation means that estimates deterioration in an engagement property of the engagement device; and an engagement means that engages the engagement device after achieving synchronization between an input speed and an output speed of the engagement device, in case the estimation means estimates that the engagement property of the engagement device is deteriorated, and the driving mode is shifted from the first driving mode to the second driving mode.

The vehicle to which the vehicle control system is applied is comprised of a differential mechanism having a first rotary element connected to an output shaft of the engagement device, a second rotary element connected to a motor, and a third rotary element connected to the driving wheel. The engagement means includes a means that synchronize the output speed of the engagement device with the input speed of the engagement device by controlling a rotational speed of the motor. The vehicle control system is configured to select the first driving mode in case a demanded driving force or a vehicle speed is smaller than a preset value, and to select the second driving mode in case a demanded driving force or a vehicle speed is larger than the preset value, and further comprised of a means that lowers the preset value in case the estimation means estimates that the engagement property of the engagement device is deteriorated.

Specifically, the engagement means includes a starting means that starts the engine after engaging the engagement device after achieving synchronization between the input speed and the output speed of the engagement device, in case of switching the driving mode from the first driving mode to the second driving mode and starting the engine.

The engagement device includes a friction clutch that transmits torque by pushing a first rotary member onto a second rotary member. According to the present invention, the vehicle control system is further comprised of a first detection means that detects an axial position of the first rotary member; and a second detection means that detects a change in a torque or a rotational speed of a third rotary member when the engagement device starts being engaged. In addition, the estimation means includes a means that is configured to calculate a depth of wear of the engagement device based on a position of the first rotary member detected by the first detection means when the second detection means detects a fact that the torque or the rotational speed of the third rotary member is changed, and to determine the deterioration in the engagement property of the engagement device if the calculated value of the depth of wear of the engagement device is equal to or larger than a first threshold.

The estimation means further includes a means that determines a fact that the engagement property of the engagement device is deteriorated based on a fact that duration of use of the engagement device is equal to or larger than a second threshold.

The estimation means further includes a means that determines a fact that the engagement property of the engagement device is deteriorated based on a fact that number of engagement or disengagement of the engagement device is equal to or larger than a third threshold.

The estimation means further includes a means that determines a fact that the engagement property of the engagement device is deteriorated based on a fact that travel distance of the vehicle is equal to or larger than a fourth threshold.

Thus, according to the present invention, the vehicle control system is configured to estimate the engagement property of the engagement device. If the engagement property of the engagement device seems to be deteriorated, the engagement device is engaged after achieving synchronization between an input speed and an output speed on the occasion of shifting the driving mode from the first driving mode to the second driving mode. That is, the engagement device will not be engaged while slipping if the engagement property thereof is deteriorated. According to the present invention, therefore, the controllability of the engagement device will not be deteriorated even if the engagement property thereof is deteriorated.

As described, the vehicle to which the vehicle control system is applied is comprised of the differential mechanism having the first rotary element connected to the output shaft of the engagement device, the second rotary element connected to the motor, and the third rotary element connected to the driving wheel. Therefore, the output speed of the engagement device can be synchronized with the input speed of the engagement device by controlling a rotational speed of the motor. As also described, the vehicle control system is configured to select the first driving mode in case a demanded driving force or a vehicle speed is smaller than a preset value, and to select the second driving mode in case a demanded driving force or a vehicle speed is larger than the preset value. According to the present invention, a changing amount of rotational speed of the motor to engage the engagement device can be reduced by lowering the preset value as a boundary between the first driving mode and the second driving mode, in case the estimation means estimates that the engagement property of the engagement device is deteriorated. In addition, a changing amount of rotational speed of the motor can be reduced when increasing a speed of the first rotary element to the engine speed determined based on the drive demand after engaging the engagement device. Therefore, the acceleration response will not be deteriorated on the occasion of shifting the driving mode from the first driving mode to the second driving mode.

BRIEF DESCRIPTION OF THE DRAWINGS

Features, aspects, and advantages of exemplary embodiments of the present invention will become better understood with reference to the following description and accompanying drawings, which should not limit the invention in any way.

DETAILED DESCRIPTION OF THE PREFERRED EMBODIMENT(S)

Figure 4:
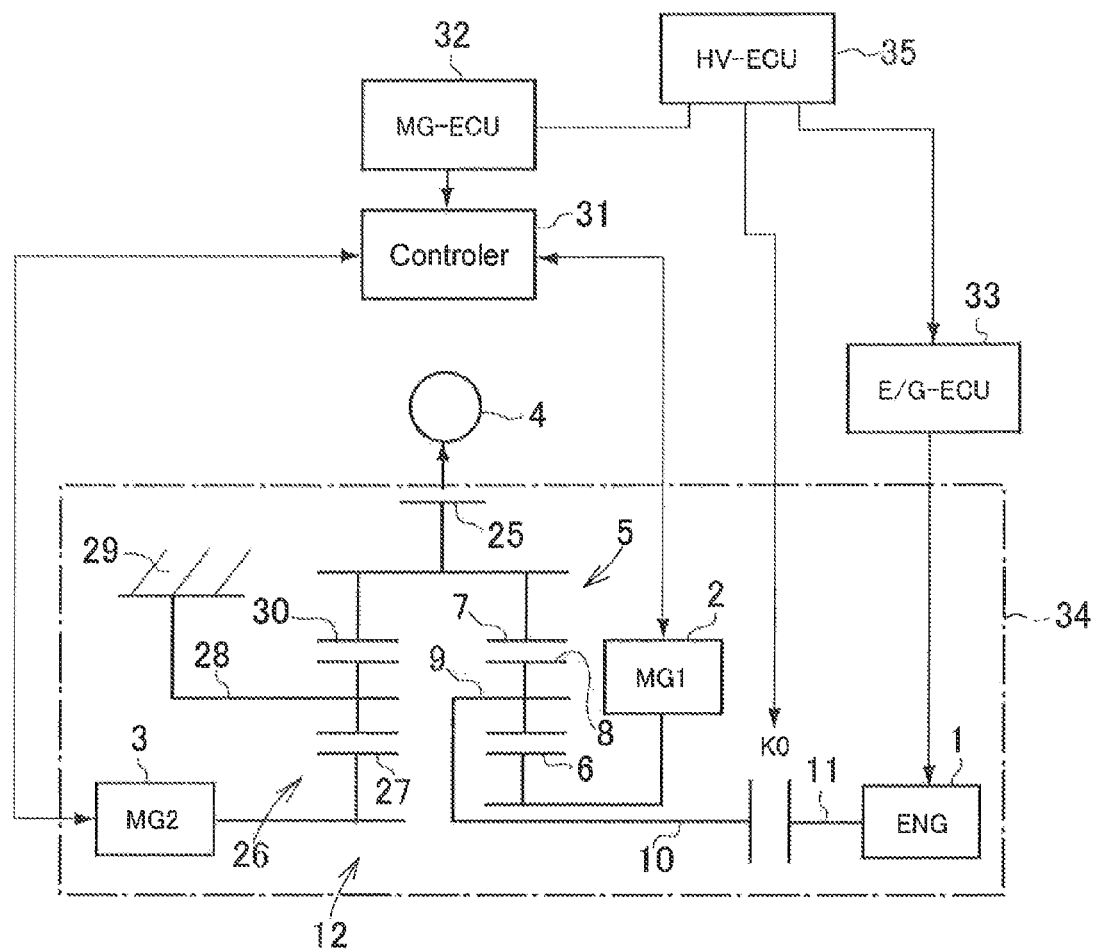
FIG. 4 is a skeleton diagram showing one example of a structure of the vehicle to which the control system of the present invention is applied.

The vehicle control system of the present invention is applied to a vehicle having an engagement device for selectively transmit a torque between the engine and the driving wheels. A preferred example of the vehicle to which the present invention is applied is illustrated in FIG. 4. The vehicle shown in FIG. 4 is a hybrid vehicle comprised of an engine 1, and motor-generators 2 and 3. The vehicle shown in FIG. 4 can be driven not only by the engine 1 but also by a combination of the engine 1 and the motor-generator 2(3). In addition, the vehicle can also be driven only by the motor generator 2(3). The motor-generators 2 and 3 are adapted to regenerate energy while the vehicle is running. When the vehicle is driven by the motor-generator 2(3), the engine 1 is allowed to be stopped and restarted. Under EV mode where the motor-generator 2 or 3 is used as a prime mover for driving the vehicle, it is preferable to reduce a power loss resulting from rotating the engine 1 concurrently. In addition, if the vehicle 1 is driven by any one of the motor-generators 2 and 3, it is further preferable to reduce a power loss resulting from concurrently rotating the other motor-generator 2 or 3 that is not outputting power. To this end, a clutch K0 is disposed on a power train 12 for transmitting power of the engine 1 to the driving wheels 4 so as to selectively disconnect the engine 1 from the power train 12.

In the vehicle shown in FIG. 4, the power of the engine (ENG) 1 is partially transmitted to the driving wheel 4 by a mechanical means. Remaining power of the engine 1 is once converted into an electric power, and then converted into a mechanical power again to be transmitted to the driving wheels 4. In order to distribute the power of the engine 1, a power distribution device 5 is disposed on the power train 12. As the conventional two-motor type hybrid drive units, a single-pinion type planetary gear unit adapted to perform a differential action using three rotary elements is used as the power distribution device 5. Specifically, the power distribution device 5 is comprised of: a sun gear 6; a ring gear 7 arranged concentrically with the sun gear 6; a pinion gear 8 meshing with both the sun gear 6 and the ring gear 7; and a carrier 9 holding the pinion gear 8 in a manner such that the pinion gear 8 is allowed to rotate and revolve around the sun gear 8. Accordingly, the power distribution device 5 serves as the differential mechanism of the invention, the sun gear 6 serves as the first rotary element of the invention, the carrier 9 serves as the second rotary element of the invention, and the ring gear 7 serves as the third rotary element of the invention.

Specifically, the carrier 9 is connected with an input shaft 10 to serve as an input element. The aforementioned clutch K0 is disposed between the input shaft 10 and an output shaft (i.e., a crankshaft) 11 of the engine 1. The clutch K0 is adapted to selectively connect and disconnect the engine 1 to/from the power distribution device 5 disposed on the power train 12. For this purpose, a friction clutch adapted to be engaged gradually is used as the clutch K0. Therefore, a torque transmitting capacity of the clutch K0 is changed gradually from a completely disengaged state until being engaged completely without causing a slip. Accordingly, the clutch K0 serves as the engagement device of the present invention. An example of the clutch K0 is shown in FIG. 5, and as can be seen from FIG. 5, a structure of the clutch K0 is similar to that of the conventional dry-type clutches.

Figures 5, 6:
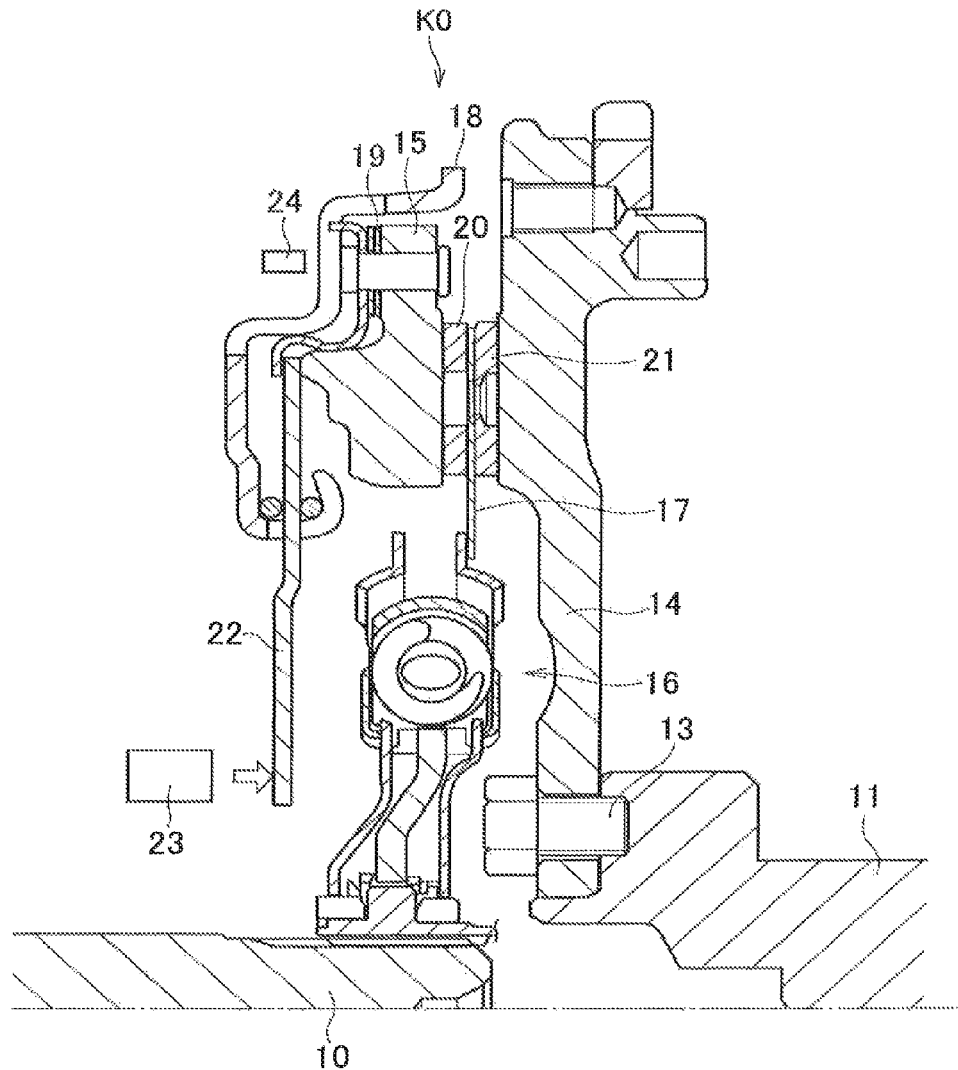
FIG. 5 is a sectional view showing one example of a structure of the clutch.
FIG. 6 is a table showing an engagement status of the clutch under each driving mode.

As shown in FIG. 5, the clutch K0 is comprised of: a flywheel 14 attached to the output shaft 11 by a bolt 13; an annular pressure plate 15 being opposed to the flywheel 14; and a clutch disc 17 connected with the input shaft 10 through a torsional damper 16. Thus, the clutch K0 is adapted to transmit torque by clamping the clutch disc 17 by the flywheel 14 and the pressure plate 15. Therefore, a torque transmitting capacity of the clutch K0 is varied according to a pressure to clamp the clutch disc 17 by the flywheel 14 and the pressure plate 15. The pressure plate 15 is covered by a clutch cover 18 attached to the flywheel 14 by a not shown rivet. In order to allow the pressure plate 15 to be rotated and moved in the axial direction integrally with the clutch cover 18, the clutch plate 15 is connected with the clutch cover 18 through a strap plate 19. In addition, frictional members 20 and 21 are attached to each surface of the clutch disc 17.

The pressure plate 15 is pushed elastically toward the clutch disc 17 by a diaphragm spring 22, and an elastic force of the diaphragm spring 22 applied to the pressure plate 15 is controlled using leverage by applying a load of a hydraulic actuator 23 to an inner circumferential portion of the diaphragm spring 22. For example, the pressure for clamping the clutch disc 17 is reduced as an increase in the load applied to the diaphragm spring 22 from the hydraulic actuator 23. Accordingly, a torque transmitting capacity of the clutch K0 is varied in accordance with the hydraulic pressure applied from the hydraulic actuator 23. In addition, a sensor 24 is arranged to detect an axial position of the pressure plate 15 when the clutch K0 starts transmitting torque. Thus, the pressure plate 15 serves as the first rotary member of the invention, and the clutch disc 17 serves as the second rotary member of the invention.

According to the present invention, the engagement device should not be limited to the clutch K0 shown in FIG. 5. For example, any of conventional dry-type clutch, wet type-clutch, single plate-type clutch, and multiple plate-type clutch may also be used as the clutch K0. In addition, an electromagnetic actuator may also be used instead of the hydraulic actuator 23.

Now referring back to FIG. 4, the first motor-generator (MG1) 2 establishes a reaction against the torque inputted to the power distribution device 5 through the clutch K0. To this end, the first motor-generator 2 is connected to the sun gear 6, and outputs a torque in an opposite direction against the torque rotating the first motor-generator 2. In this preferred example, a permanent magnet synchronous motor having a generating function is used as the first motor-generator 2. The ring gear 7 as the output element is integrated with the output gear 25 to output a driving force to the driving wheels 4. Here, although not especially shown in FIG. 4, the vehicle illustrated therein is provided with a conventional differential gear unit, a drive shaft and so on to transmit the torque from the output gear 25 to the driving wheels 4.

The engine 1, the power distribution device 5 and the first motor-generator 2 are arranged on a common axis, and the second motor-generator (MG2) 3 is arranged coaxially therewith but separated. The second motor-generator 3 is also a permanent magnet synchronous motor that is adapted not only to generate a driving force but also to regenerate energy, and connected with the aforementioned output gear 25 through a speed reduction device 26. Specifically, a single-pinion type planetary gear unit is also used as the speed reduction device 26, and as shown in FIG. 4, a sun gear 27 is connected with the second motor-generator 3, a carrier 28 is fixed to a stationary portion 29 such as a housing, and a ring gear 30 is integrated with the output gear 25.

Those motor-generators 2 and 3 are electrically connected with a controller 31 comprising an electric storage device and an inverter. In order to control the controller 31, an electric control unit (as will be called MG-ECU hereinafter) 32 is connected to the controller 31. The MG-ECU 32 is composed mainly of a microcomputer configured to carry out a calculation based on preinstalled data and data or command signal to be inputted thereto, and to output a calculation result to the controller 31 in the form of command signal. Accordingly, the motor-generators 2 and 3 are operated as the motor or generator based on the command signal from the controller 31, and torques thereof are also controlled by the controller 31.

The engine 1 is started and stopped electrically. Specifically, if the engine 1 is a gasoline engine, an opening degree of a throttle valve, a feeding amount of fuel, a cessation of fuel delivery, an execution, a cessation and a timing of ignition etc. are controlled electrically. For this purpose, another electronic control unit (as will be called E/G-ECU hereinafter) 33 is connected with the engine 1. The E/G-ECU 33 is also composed mainly of a microcomputer configured to carry out a calculation based on preinstalled data and data or command signal to be inputted thereto, and to output a calculation result to the engine 1 in the form of command signal.

Thus, a prime mover 34 is comprised of the engine 1, the motor-generators 2 and 3, the clutch K0 and the power distribution device 5, and still another electronic control unit (as will be called HV-ECU hereinafter) 35 is provided to control the prime mover 34. The HV-ECU 35 is also composed mainly of a microcomputer configured to carry out after-explained controls by sending command signals to the MG-ECU 32 and the E/G-ECU 33.

A driving mode of the vehicle shown in FIG. 4 is selected from hybrid mode (abbreviated as HV mode) in which the vehicle is driven by the power of the engine 1, and electric vehicle mode (abbreviated as EV mode) in which the vehicle is driven by the electric power. Specifically, the EV mode can be selected from disconnecting EV mode in which the engine 1 is disconnected from the power train 12, and normal EV mode in which the engine 1 is connected with the power train 12. FIG. 6 is a table showing an engagement status of the clutch K0 under each driving mode. As can be seen from FIG. 6, the clutch K0 is disengaged under the disconnecting EV mode. In contrast, the clutch K0 is engaged under the normal EV mode and the HV mode. Specifically, the driving mode of the vehicle is selected from the HV mode, the disconnecting EV mode and the normal EV mode, depending on a running condition of the vehicle such as an opening degree of accelerator, a drive demand, a vehicle speed, a state of charge (abbreviated as SOC hereinafter) of electric storage device and so on. For example, when a relatively large driving force is demanded, the HV mode is selected to generate the driving force mainly by the engine 1. To the contrary, when a demanded driving force is relatively small, the normal EV mode or the disconnecting EV mode is selected to drive the vehicle by the driving force generated by the second motor-generator 3, without generating the driving force by the engine 1. Likewise, when the vehicle speed is relatively high, the HV mode is selected. To the contrary, when the vehicle speed is relatively low, the normal EV mode or the disconnecting EV mode is selected. Here, the disconnecting EV mode corresponds to the first driving mode of the present invention, and the HV mode and the normal EV mode correspond to the second driving mode of the present invention.

Figure 7:
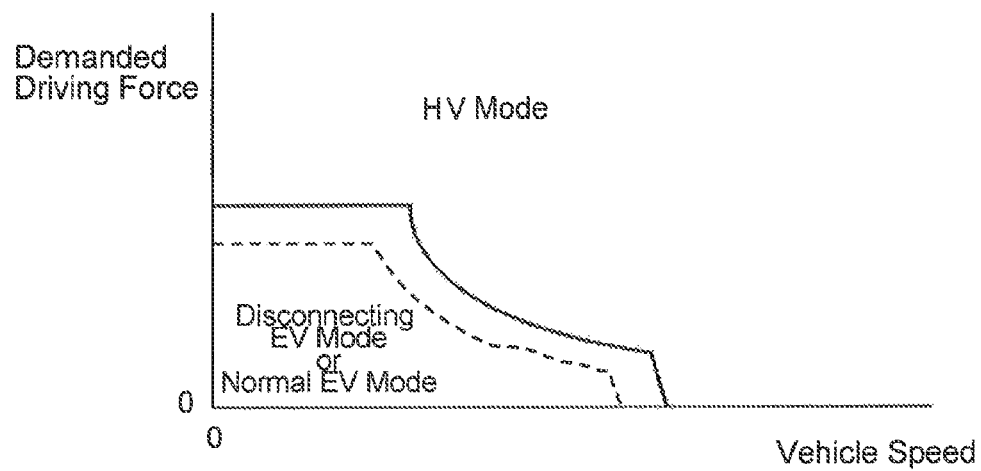
FIG. 7 is a graph showing regions of each driving mode.

FIG. 7 shows regions of each driving mode defined by a demanded driving force and a vehicle speed. If the demanded driving force and the vehicle speed are within the region defied by a solid line, the normal EV mode or the disengaging EV mode is selected. In contrast, if the demanded driving force and the vehicle speed are higher than the solid line, the HV mode is selected. However, the normal EV mode and the disconnecting EV mode are switched based on various kinds of conditions other than the demanded driving force and the vehicle speed. For example, the normal EV mode is selected if there is a high possibility to restart the engine 1 being stopped automatically, and the disconnecting EV mode is selected if it is necessary to reduce a power loss resulting from rotating the engine 1 concurrently when the vehicle is driven only by the power of the second motor-generator 3.

Figure 8:
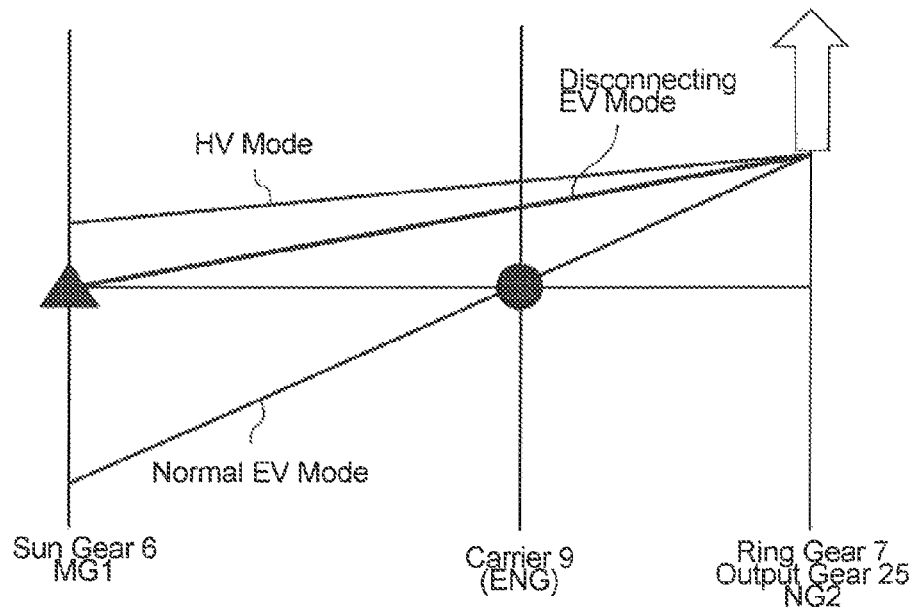
FIG. 8 is a nomographic diagram showing an operating state under each driving mode.

Here will be explained an operating state of the hybrid drive unit under each driving mode. FIG. 8 is a nomographic diagram of the dower distribution device 5. In FIG. 8, each vertical line individually represents the sun gear 6, the carrier 9 and the ring gear 7, and clearances between the sun gear 6 and the carrier 9 and between the carrier 9 and the ring gear 7 are individually determined in accordance with a gear ratio of the planetary gear unit serving as the power distribution device 5. In addition, the vertical direction represents a rotational direction, and a rotational speed is represented at a vertical position. In FIG. 8, the diagonal line as indicated "Disconnecting" represents an operating state under the disconnecting EV mode. Under the disconnecting EV mode, the second motor-generator 3 is used as a motor to drive the vehicle. In this situation, the engine 1 is stopped and disconnected from the power train 12 by disengaging the clutch K0, and the first motor-generator 2 is also stopped. Therefore, the sun gear 6 is not rotated, the ring gear 7 is rotated together with the output gear 25 in the forward direction, and the carrier 9 is rotated in the forward direction at a speed reduced in accordance with the gear ratio of the power distribution device 5.

In FIG. 8, the diagonal line as indicated "Normal" represents an operating state under the normal EV mode. Under the normal EV mode, the vehicle is driven by the power of the second motor-generator 3, and the engine 1 is stopped. In this situation, therefore, the carrier 9 is stopped, the ring gear 7 is rotated in the forward direction, and the sun gear 6 is rotated in the backward direction. In addition, the first motor-generator 2 can be used as a generator in this situation. In turn, the diagonal line as indicated "HV" represents an operating state under the HV mode. Under the HV mode, the clutch K0 is engaged and the engine 1 generates the driving force so that the carrier 9 is rotated by the torque in the forward direction. In this situation, a counter torque is applied to the sun gear 6 by operating the first motor-generator 2 as a generator. Consequently, a torque to rotate in the forward direction will appear on the ring gear 7. In this case, the electric power generated by the first motor-generator 2 is delivered to the second motor-generator 3. Therefore, the second motor-generator 3 is driven as a motor and a driving force thereof is transmitted to the output gear 25. Thus, under the HV mode, the power of the engine 1 is partially transmitted to the output gear 25 through the power distribution device 5. The remaining power of the engine 1 is converted into an electric power by the first motor-generator 2 and delivered to the second motor-generator 3. Then, the electric power thus delivered to the second motor-generator 3 is converted into a mechanical power again and delivered to the output gear 25. Such energy regeneration is carried out irrespective of selected driving mode by operating any one of the motor-generators 2 and 3 as a generator, under the situation that the prime mover is not required to output the driving force aggressively.

As described, if the SOC of the electric storage device is low, or if a large driving force is demanded under the disconnecting EV mode, the engine 1 is started and the power of the engine 1 is transmitted to the power train 12 through the clutch K0. The clutch K0 is also engaged under the situation where the driving mode is switched from the disconnecting EV mode to the normal EV mode so that the engine 1 is expected to be restarted. On this occasion, if an input speed and an output speed of the clutch K0 are different, it is preferable to engage the clutch K0 while allowing the clutch K0 to slip so as to avoid an abrupt change in the driving force resulting from engaging the clutch K0. To this end, the clutch K0 being engaged is allowed to cause a slip unless it is worn out, specifically, unless an actual torque transmitting capacity thereof is degraded in comparison with a calculation value of torque transmitting capacity calculated based on an output pressure of the hydraulic actuator 23.

If a friction surface of the frictional member 20 or 21 of the clutch K0 is worn out, a friction coefficient thereof is lowered and an engagement starting position of the clutch K0 is changed. Consequently, an engagement property of the clutch K0 may be changed, that is, a torque transmitting capacity of the clutch K0 is deteriorated. In this situation, an actual value of the torque transmitting capacity of the clutch K0 may differ from a theoretical value of the torque transmitting capacity determined based on a signal sent to the actuator 23 to control the engagement pressure of the clutch K0. In order to avoid the above-explained disadvantage, the control system of the present invention is configured to estimate deterioration in the engagement property, that is, the torque transmitting capacity of the clutch K0. According to the present invention, if the engagement property of the clutch K0 is deteriorated, the clutch K0 will be engaged while causing synchronization between an input speed and an output speed of the clutch K0.

Figure 1:
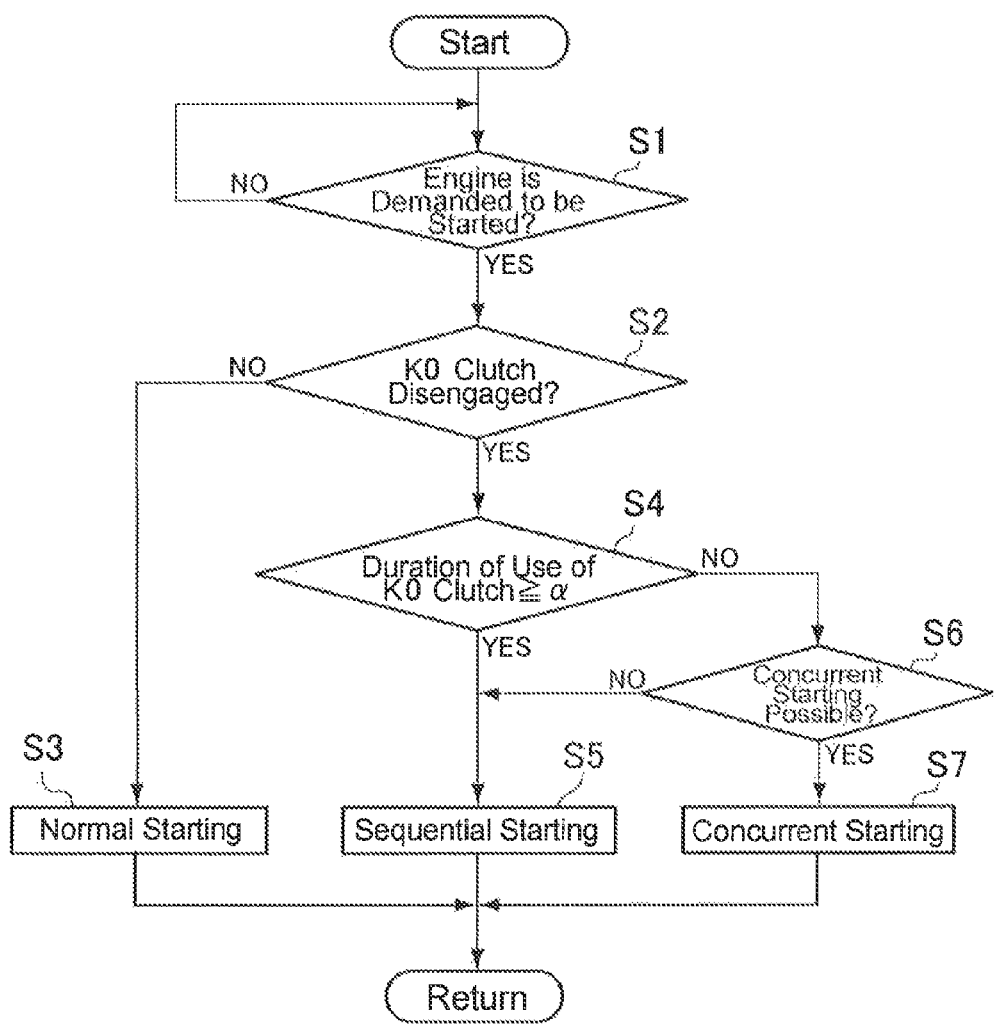
FIG. 1 is a flowchart showing one example of the control to be carried out by the control system of the present invention.

Refereeing now to FIG. 1, a preferred example of the control to be carried out by the control system of the present invention is shown. The control example shown in FIG. 1 is carried out under the situation that the driving mode of the vehicle running under the normal EV mode or the disconnecting EV mode while stopping the engine 1 is switched to the HV mode. Here, the routine shown in FIG. 1 is repeated at predetermined intervals. First of all, it is determined whether or not the engine 1 is demanded to be started (at step S1). For example, the determination of step S1 is made based on a fact that the drive demand or the vehicle speed is increased and the driving mode is therefore to be switched from the normal EV mode or the disconnecting EV mode to the HV mode, or based on a fact that the SOC is lowered to the lower limit value.

If the driving mode is not necessary to be switched from the normal EV mode or the disconnecting EV mode to the HV mode, or if the SOC is sufficient, the answer of step S1 will be NO and the routine is repeated until the engine 1 is demanded to be started. To the contrary, the drive demand or the vehicle speed is increased and the driving mode is therefore to be switched from the normal EV mode or the disconnecting EV mode to the HV mode, or if the SOC is lowered to the lower limit value, the answer of step S1 will be YES. In this case, it is determined whether or not the clutch K0 is disengaged (at step S2). Such determination of step S2 can be made based on a fact that the disconnecting EV mode is selected or not. Alternatively, the determination of step S2 may also be made based on the command signal sent to the hydraulic actuator 23 from the HV-ECU 35.

If the clutch K0 is engaged so that the answer of step S2 is NO, the engine 1 is started in a normal manner (at step S3), and the routine is returned. Specifically, a cranking of the engine 1 is carried out using a not shown starter or the first motor-generator 2, and an ignition of the engine 1 takes place when a speed of the engine 1 reaches a predetermined speed. However, if the cranking of the engine 1 is carried out by the first motor-generator 2, the driving force may be reduced. In order to avoid such reduction in the driving force, it is preferable to establish a torque for increasing the rotational speed of the engine 1 by the second motor-generator 3 when cranking the engine 1.

In contrast, if the clutch K0 is disengaged so that the answer of step S2 is YES, it is determined whether or not (an integration value of) duration of use of the clutch K0 is equal to or larger than a predetermined threshold $\alpha$ (at step S4). That is, deterioration in the engagement property of the clutch K0, in other words, deterioration in the torque transmitting capacity of the clutch K0 is judged at step S4. To this end, a length of time before a commencement of phenomenon in that a desired torque transmitting capacity cannot be achieved by the clutch K0 even if a theoretical value to achieve the desired torque transmitting capacity is applied thereto from the hydraulic actuator 23 is determined based on a result of an experimentation or a simulation, and the value thus determined is used as the threshold $\alpha$. Alternatively, the determination of step S4 may also be carried out based on a fact that an integration value of a travel distance of the vehicle exceeds a predetermined threshold value, or based on a fact that total number of engagement or disengagement of the clutch K0 exceeds a predetermined threshold value. Otherwise, the determination of step S4 may also be carried out by estimating a depth of wear from the engagement starting position of the clutch K0. Here, such determination of deterioration in the clutch K0 may also be carried out by preparing a specific subroutine.

Here will be explained a control example for determining a fact that the clutch K0 is worn out with reference to FIG. 2. First of all, the engagement starting position of the clutch K0 at which the clutch K0 starts transmitting a torque is detected (at step S21). When the clutch K0 is engaged, rotational speeds and torques of the input shaft 10 and the first motor-generator 2 are varied. Therefore, in order to detect the engagement starting position, a position of the pressure plate 15 is detected by the sensor 24 at an instant when the rotational speed of the input shaft 10 or the first motor-generator 2 is changed, or when the output torque of the first motor-generator 2 is changed. Such change in the rotational speed of the input shaft 10 or the first motor-generator 2, and change in the output torque of the first motor-generator 2 may be detected by detecting a rotational speed of the output shaft of the first motor-generator 2, or by detecting a current supplied to the first motor-generator 2 from the controller 31. Thus, the engagement starting position of the clutch K0 is detected by detecting a position of the pressure plate 15 by the sensor 24. Accordingly, the sensor 24 serves as the first detection means of the present invention, the means detecting the rotational speed or torque of the input shaft 10 or the first motor-generator 2 serves as the second detection means of the present invention, and the input shaft 10 and the first motor-generator 10 correspond to the third rotary member of the present invention.

Then, a depth of wear of the clutch K0 from the engagement starting position detected by the sensor 24 is calculated (at step S22). Specifically, the depth of wear of the clutch K0 is calculated based on a difference between the engagement starting position of unused clutch K0 and the engagement starting position detected at step S21. Then, it is determined whether or not the depth of wear calculated at step S22 is equal to or larger than a predetermined threshold $\beta$ (at step S23). For example, the threshold $\beta$ is determined based on a wear allowance between a contact surface of the frictional member 20 or 21 and a not shown rivet fixing the frictional member 20 or 21 to the clutch disc 17.

If the depth of wear of the clutch K0 is smaller than the threshold $\beta$ so that the answer of step S23 is NO, the determination of step S23 is repeated until the depth of wear of the clutch K0 becomes equal to the threshold β or exceeds the threshold β. To the contrary, if the depth of wear of the clutch K0 is equal to or larger than the threshold β so that the answer of step S23 is YES, the slip control for engaging the clutch K0 while causing a slip is restricted (at step S24), and the routine is returned. In this case, if the clutch K0 is engaged while causing a slip, an actual torque transmitting capacity to be achieved may differ from the theoretical value of the torque transmitting capacity calculated based on the hydraulic pressure applied from the hydraulic actuator 23, or otherwise the rivet may be contacted with the pressure plate 15 or the flywheel 14. Therefore, the slip control for engaging the clutch K0 while causing a slip is restricted at step S24. The above-explained step S23 or S24 corresponds to the estimating means of the present invention.

Figure 2:
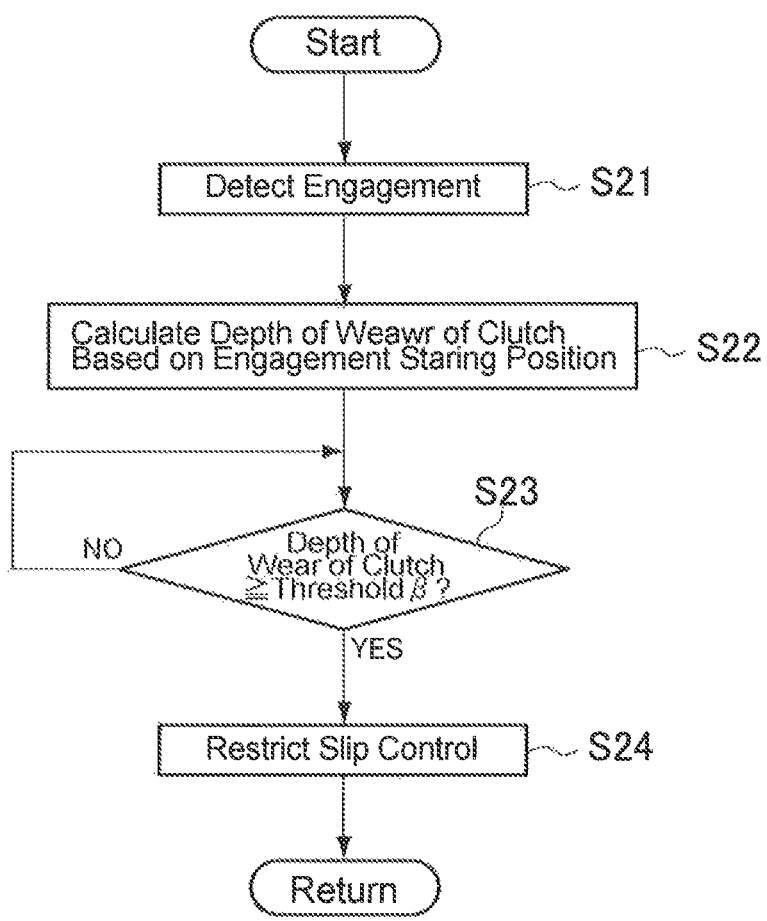
FIG. 2 is a flowchart showing one example of the control for estimating deterioration in an engagement property of the clutch.

Referring back to FIG. 1, if the duration of use of the clutch K0 is equal to or longer than a predetermined threshold α so that the answer of step S4 is YES, or if the slip control is restricted at step S24 shown in FIG. 2, it is considered that the engagement property of the clutch K0 is deteriorated and that the clutch K0 is difficult to be controlled. In this situation, therefore, the clutch K0 is engaged after achieving synchronization between an output speed and an input speed, and then the engine 1 is started (at step S5). In order to achieve synchronization between the input speed and the output speed of the clutch K0, a rotational speed of the carrier 9 is reduced to zero by controlling the rotational speed of the first motor-generator 2, and then the clutch K0 is engaged. On this occasion, the clutch K0 is engaged completely so as to maximize the torque transmitting capacity of the clutch K0. After thus engaging the clutch K0, a cranking of the engine 1 is carried out by the first motor-generator 2 or a not shown starter motor, and then, an ignition of the engine 1 takes place. The control for starting the engine 1 in the above-explained manner corresponds to the engine starting means of the present invention, and indicated as "Sequential Start" in FIG. 1. Then, the routine is returned.

To the contrary, if the duration of use of clutch K0 is shorter than the threshold α so that the answer of step S4 is NO, it is determined whether or not the engine 1 is allowed to be started in conjunction with engaging the clutch K0 while causing a slip (at step S6). The determination of step S6 can be made based on a factor contributing to deteriorate durability of the clutch K0 if the clutch K0 is engaged while causing a slip. For example, the determination of step S6 can be made based on whether or not a temperature of the clutch K0 is equal to or higher than a predetermined value. That is, if the temperature of the clutch K0 is higher than the predetermined value, the answer of step S6 will be NO and the clutch K0 will not be engaged while causing a slip. In this case, the routine advances to step S5 to carry out the sequential start of the engine 1.

To the contrary, if the engine 1 is allowed to be engaged while causing a slip so that the answer of step S6 is YES, the engine 1 is started in conjunction with engaging the clutch K0 while causing a slip (at step S7), and then the routine is returned. Specifically, the engine 1 is started by carrying out a cranking by a torque transmitted through the clutch K0 from e.g., the not shown starter motor, while gradually increasing an engagement pressure of the clutch K0. In this case, an output torque of the engine 1 can be transmitted to the driving wheels 4 promptly. In FIG. 1, the control for starting the engine 1 in conjunction with engaging the clutch K0 while causing a slip is indicated as "Concurrent Starting".

Thus, if the engagement property of the clutch K0 is assumed to be deteriorated, the clutch K0 is engaged while achieving synchronization between an input speed and an output speed. In this case, if the vehicle is running at high speed, the rotational speed of the carrier 9 has to be reduced significantly to zero by rotating the first motor-generator 2 backwardly. Therefore, it may take long time to engage the clutch K0. In addition, as a result of thus reducing the rotational speed of the carrier 9 to zero, a rotational speed of the pinion gear 8 will be raised excessively thereby deteriorating durability of the pinion gear 8. Further, in order to optimize the fuel economy of the engine under the HV mode, it is necessary to rotate the first motor generator 2 in the forward direction. However, as described, the rotational speed of the first motor-generator 2 has to be lowered to a negative speed to be synchronized with the input speed of the clutch K0 when engaging the clutch K0. Nevertheless, if a large driving force is demanded in this situation, the rotational speed of the first motor-generator 2 has to be raised from the negative speed to the speed required to achieve the demanded driving force. That is, the rotational speed of the first motor-generator 2 has to be raised over a long range, and a torque transmission will be interrupted during raising the speed of the first motor-generator 2. In this situation, therefore, it may take long time to transmit the torque of the engine 1 to the driving wheels 4, in other words, the acceleration response may be degraded.

In order to avoid the above-explained disadvantages, according to the vehicle control system of the present invention, the region where the disconnecting EV mode is selected is restricted within a region defined by the broken line shown in FIG. 7. Specifically, as can be seen from FIG. 7, a border of the demanded driving force and a border of the vehicle speed to carry out a shifting from the disconnecting EV mode to the HV mode are set to lower values, in a manner not deteriorate the acceleration response, required time to engage the clutch K0, durability of the pinion gear 8 and so on.

Figure 3:
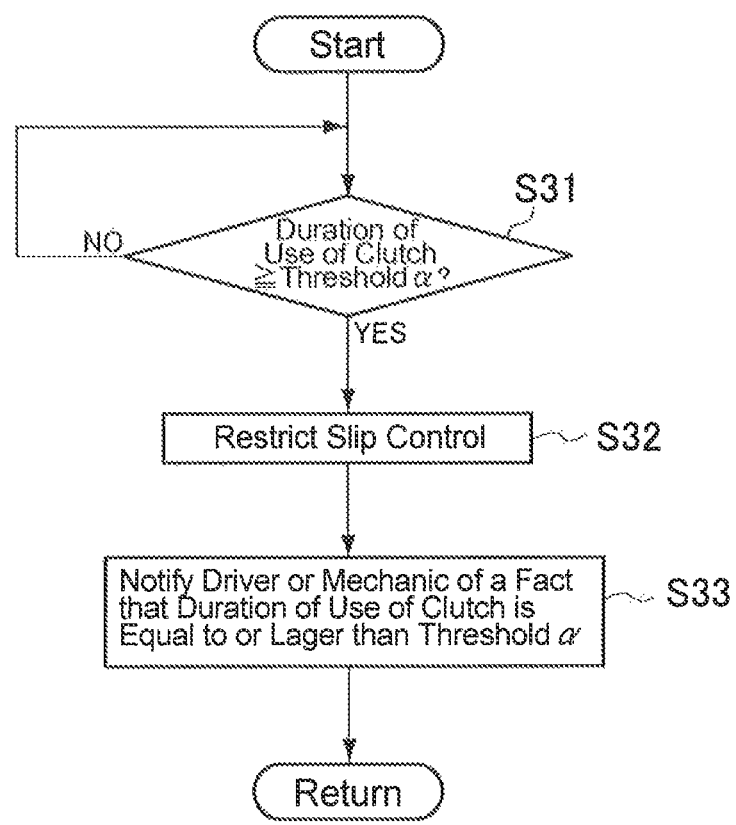
FIG. 3 is a flowchart showing one example of the control for transmitting information about a fact that the slip control is restricted to the driver or engineer.

Thus, according to the present invention, the clutch K0 is engaged while achieving synchronization between the input speed and the output speed but without causing a slip if the engagement property of the clutch K0, that is, the torque transmitting capacity is deteriorated. In this case, however, the fuel and electric efficiency may be deteriorated. Therefore, the vehicle control system of the present invention is configured to notify the driver or the mechanic of a fact that the slip control of the clutch K0 is restricted. Specifically, the control example shown in FIG. 3 is carried out, and the control shown in FIG. 3 may be carried out independent of the controls shown in FIGS. 1 and 2. As shown in FIG. 3, first of all, it is determined whether or not duration of use of the clutch K0 is equal to or larger than a predetermined threshold α (at step S31). The determination of step S31 may be carried out by the same procedure executed at the above-explained step S4 in FIG. 1, and the determination of step S31 is repeated if the answer is NO, until the duration of use of the clutch K0 exceeds the predetermined threshold α.

In contrast, if the answer of step S31 is YES, the slip control for engaging the clutch K0 while causing a slip is restricted as the aforementioned step S24 in FIG. 2 (at step S32). Then, the driver or the mechanic is notified that the duration of use of the clutch K0 exceeds the predetermined threshold α (at step S33), and the routine is returned. For example, the fact that the duration of use of the clutch K0 exceeds the predetermined threshold α can be notified by an inspection lamp or a voice message.

Thus, according to the present invention, the clutch K0 is engaged while achieving synchronization between an input speed and the output speed if the engagement property, that is, the torque transmitting capacity of the clutch K0 is seemed to be deteriorated. Therefore, any difficulty in the control of the clutch K0 resulting from such deterioration can be avoided. Moreover, the rivet fixing the friction members 20 or 21 to the clutch K0 can be prevented from being contacted with the flywheel 14 and the pressure plate 15 even if the friction members 20 or 21 are worn out. Therefore, a noise will not be created by direct contact between the rivet and the flywheel 14 or the pressure plate 15, and the flywheel 14 and the pressure plate 15 can be prevented from being worn out. Further, since the region where the disconnecting EV mode is selected is restricted, the acceleration response and the durability of the pinion gear 8 will not be deteriorated. Furthermore, the engagement property and the durability of the clutch K0 can be prevented from being deteriorated due to attrition by engaging the clutch K0 while achieving synchronization between the input speed and the output speed.

In the foregoing examples, the driving mode is shifted from the disconnecting EV mode to the HV mode while starting the engine 1. However, the controls of the present invention may also be carried out in case of shifting the driving mode from the disconnecting EV mode to the normal EV mode. In this case, the duration of use or depth of wear is estimated when shifting the driving mode from the disconnecting EV mode to the normal EV mode, and the clutch K0 is engaged while achieving synchronization between the input speed and the output speed if the duration of use or depth of wear of the clutch K0 is larger than the threshold α or β.

Although the above exemplary embodiment of the present invention have been described, it will be understood by those skilled in the art that the present invention should not be limited to the described exemplary embodiments, but that various changes and modifications can be made within the spirit and scope of the present invention. For example, the control system of the present invention may also be applied to a vehicle in which a motor-generator is connected to an output shaft of an engine through a clutch, and an output shaft of the motor-generator is connected to driving wheels through another clutch. Likewise, the control system may also be applied to a vehicle in which a continuously variable transmission is arranged in an output side of the clutch instead of the motor-generator. In addition, the controls of the present invention may be modified to achieve synchronization between the input speed and the output speed of the clutch by controlling an opening degree of an accelerator or an ignition timing of the engine, instead of controlling the speed of the first motor-generator

What is claimed is:

1. A vehicle control system for a vehicle having an engagement device,
wherein the engagement device is adapted to govern a torque transmitting capacity between an engine and a driving wheel, and
wherein the vehicle control system is configured to switch a driving mode of the vehicle selectively between: a first driving mode in which the engagement device is disengaged to disconnect a torque transmission between the engine and the driving wheel; and a second driving mode in which the engagement device is engaged to transmit a torque between the engine and the driving wheel, comprising:
a controller which is configured to estimate deterioration in an engagement property of the engagement device, and to engage the engagement device after achieving synchronization between an input speed and an output speed of the engagement device, if the engagement property of the engagement device is deteriorated when the driving mode is shifted from the first driving mode to the second driving mode.

2. The vehicle control system as claimed in claim 1, wherein the vehicle is comprised of a differential mechanism having a first rotary element connected to an output shaft of the engagement device, a second rotary element connected to a motor, and a third rotary element connected to the driving wheel;
wherein the controller is further configured to synchronize the output speed of the engagement device with the input speed of the engagement device by controlling a rotational speed of the motor;
to select the first driving mode if a demanded driving force or a vehicle speed is smaller than a preset value, and to select the second driving mode if a demanded driving force or a vehicle speed is larger than the preset value; and
to lower the preset value if the engagement property of the engagement device is deteriorated.

3. The vehicle control system as claimed in claim 1, wherein the controller is further configured to start the engine after engaging the engagement device after achieving synchronization between the input speed and the output speed of the engagement device, when switching the driving mode from the first driving mode to the second driving mode and starting the engine.

4. The vehicle control system as claimed in claim 1, wherein the engagement device includes a friction clutch that transmits torque by pushing a first rotary member onto a second rotary member; and
further comprising:
a first detection means that detects an axial position of the first rotary member; and
a second detection means that detects a change in a torque or a rotational speed of a third rotary member when the engagement device starts being engaged; and
wherein the controller is further configured to calculate a depth of wear of the engagement device based on a position of the first rotary member detected by the first detection means when the second detection means detects a fact that the torque or the rotational speed of the third rotary member is changed, and to determine the deterioration in the engagement property of the engagement device if the calculated value of the depth of wear of the engagement device is equal to or larger than a first threshold.

5. The vehicle control system as claimed in claim 1, wherein the controller is further configured to determine a fact that the engagement property of the engagement device is deteriorated based on a fact that duration of use of the engagement device is equal to or larger than a second threshold.

6. The vehicle control system as claimed in claim 1, wherein the controller is further configured to determine a fact that the engagement property of the engagement device is deteriorated based on a fact that number of engagement or disengagement of the engagement device is equal to or larger than a third threshold.

7. The vehicle control system as claimed in claim 1, wherein the controller is further configured to determine a fact that the engagement property of the engagement device is deteriorated based on a fact that travel distance of the vehicle is equal to or larger than a fourth threshold.

* * * * *